(12) United States Patent
Griffin

(10) Patent No.: US 6,529,203 B1
(45) Date of Patent: Mar. 4, 2003

(54) ROTATING COLOR WORD

(76) Inventor: Joseph William Griffin, 81 Lincoln Ave. Apt. 2, Riverside, IL (US) 60546

( * ) Notice: Subject to any disclaimer, the term of this patent is extended or adjusted under 35 U.S.C. 154(b) by 0 days.

(21) Appl. No.: 09/536,624

(22) Filed: Mar. 28, 2000

Related U.S. Application Data (60) Provisional application No. 60/173,877, filed on Dec. 30, 1999.

(51) Int. Cl.[7] .................................................. G09G 5/02
(52) U.S. Cl. ........................ 345/594; 345/581; 345/593; 345/810
(58) Field of Search ................................ 345/594, 810, 345/593, 581

(56) References Cited

U.S. PATENT DOCUMENTS

| | | | | |
|---|---|---|---|---|
| 5,761,060 A | * | 6/1998 | Drew ........................... | 40/582 |
| 5,802,533 A | * | 9/1998 | Walker ........................ | 707/529 |
| 5,872,555 A | * | 2/1999 | Kolar et al. ................. | 345/594 |
| 6,154,752 A | * | 11/2000 | Ryan ........................... | 345/817 |

* cited by examiner

*Primary Examiner*—Kristine Kincaid
*Assistant Examiner*—Sajeda Muhebbullah

(57) ABSTRACT

The current invention discloses a method and apparatus and a computer program for editing the colors in a text line from a rotating color word selector on a personal desktop computer. The current invention comprises a select word button on the rotating color word selector. Activating this button allows the user to select color data from the color library. The color date is shown on the select order bar display apparatus as a visual color image. The order of colors on the select order bar determines the color of the words in the text line.

9 Claims, 6 Drawing Sheets

ROTATING COLOR WORD

This application claims the benefit of provisional application No. 60/173,877 filed Dec. 30, 1999.

BACKGROUND OF THE INVENTION

1. Field of the Invention

This invention relates to data processing systems, and in particular to a user interface for specifying and customizing color word, number & symbol, punctuation mark in a text line.

2. Description of Related Art

Personal computers with color displays are the standard of the industry today. Writing a letter on a personal computer or a work station, the user can change a regular font style to another style, such as bold or underline, on the text line.

The use of changing the color of background is available to the current invention as well. This technology is for signs, but not document processing.

In order to make this invention completely understood and appreciated in its proper context, references are made to two patents.

U.S. Pat. No. 5,872,555, issued to Kolar, discloses a method and apparatus for customizing color in a data processing system with the use of a Quick Color Select and Edit Custom Color Function. This device can create a custom color of text. This allows the user to choose from a greater range of color or to create color by the user. However, it does not allow the user to rotate the color of text on tho text line.

U.S. Pat. No. 5,761,060, issued to Drew, discloses a system and a method for evaluating sign legibility.

Whatever the precise merits, features and advantages or the above cited references, none of the achievements fulfills the purpose of rotating the color of words, numbers, symbols, and punctuation marks in the text line on the personal computer as it does by the present invention. This invention can be used in many applications.

SUMMARY OF THE INVENTION

According to my present invention, I have provided a graphical user interface for creating rotating color words displayed in a text line on a computer desktop of a data processing system. This graphical user, interlace comprises the followings:

Generating a request to change the text line to rotating color words on the computer desktop;
Presenting a Rotating Color Word selector on the computer desktop having a color library, the color library having a plurality of colors, a select order bar, a select order button, a random selection button, an ok button and a cancel button, the Rotating Color Word selector disappearing immediately from user viewing upon activating the ok button and immediately activating a Rotating Color Number and Symbol selector;
Identifying a color from the plurality of colors in the color library by manipulating a pointing mechanism for identifying the color;
Selecting the color by the select order button, the select order bar having a plurality of selections, the plurality of selections being placed in a left to right order, the left to right order determines the order in which the color of words are displayed in the text line;
Selecting the random selection button in the Rotating Color Word selector, activates a Rotating Color Word computer program, the Rotating Color Word computer program makes selections for the user, the Rotating Color Word selector disappearing immediately from the user viewing upon activating the random selection button, and immediately activating Rotating Color Number and Symbols selector; and
Selecting the ok buttons dismisses the Rotating Color Word selector and immediately activates a Rotating Color Number and Symbol selector.

According to my present invention, I have also provided an apparatus for creating rotating color words displayed in a text line on a computer desktop of a data processing, system. This apparatus comprises the followings:

Means for generating a request to change the text line to rotating color words on the computer desktop;
Means for presenting a Rotating Color Word selector on the computer desktop having a color library, the color library having a plurality of colors, a select order bar, a select order button, a random selection button, an ok button and a cancel button, the Rotating Color Word selector disappearing immediately from user viewing upon activating the ok button and immediately activating a Rotating Color Number and Symbol selector;
Means for identifying a color from the plurality of colors in the color library by manipulating a pointing mechanism for identifying the color;
Means for selecting the color by the select order button, the select order bar having a plurality of selections, the plurality of selections being placed in a left to right order, the left to right order determines the order in which the color words are displayed in the text line;
Means for selecting the random selection button in the Rotating Color Word selector, activating a Rotating Color Word computer program, the Rotating Color Word computer program making the selections for the user, the Rotating Color Word selector disappearing immediately from the user viewing upon activating the random selection button, and immediately activating Rotating Color Number and Symbol selector; aid
Means for selecting the ok button, dismissing the Rotating Color Word selector and immediately activating Rotating Color Number and Symbol selector.

According to my present invention, I have further provided a computer program product having a computer readable medium having computer program logic recorded thereon for a graphical user interface for creating rotating color words displayed on a computer desktop of a data processing system. This computer program product comprises the followings:

Computer readable means for generating a request to change the text line to rotating color words on the computer desktop;
Computer readable means for presenting a Rotating Color Word selector on the computer desktop having a color library, the color library having a plurality of colors, a select order bar, a select order button, a random selection button, an ok button and a cancel button, the Rotating Color Word selector disappearing immediately from a user viewing upon activating the ok button and immediately activating a Rotating Color Number and Symbol selector;
Computer readable means for identifying a color from the plurality of colors in the color library by manipulating a pointing mechanism for identifying the color;
Computer readable means for selecting the color by the select order button, the select order bar having a plurality of selections, the plurality of selections being placed in a left to right order, the left to right order determines the order in which the color of words are displayed in the text line;

Computer readable means for selecting the random selection button in the Rotating Color Word selector, activating a Rotating Color Word computer program, the Rotating Color Word computer program making the selections for the user, the Rotating Color Word selector disappearing immediately from the user viewing upon activating the random selection button, and immediately activating Rotating Number and Symbol selector; and Computer readable means for selecting the ok button dismissing the Rotating Color Word selector and immediately activating Rotating Color Number and Symbol selector.

DESCRIPTION OF THE DRAWINGS

Other features of my invention will become more evident from a consideration of the following detailed description of my patent drawings, as follows.

DETAILED DESCRIPTION OF THE PREFERRED EMBODIMENT

Figure 1:
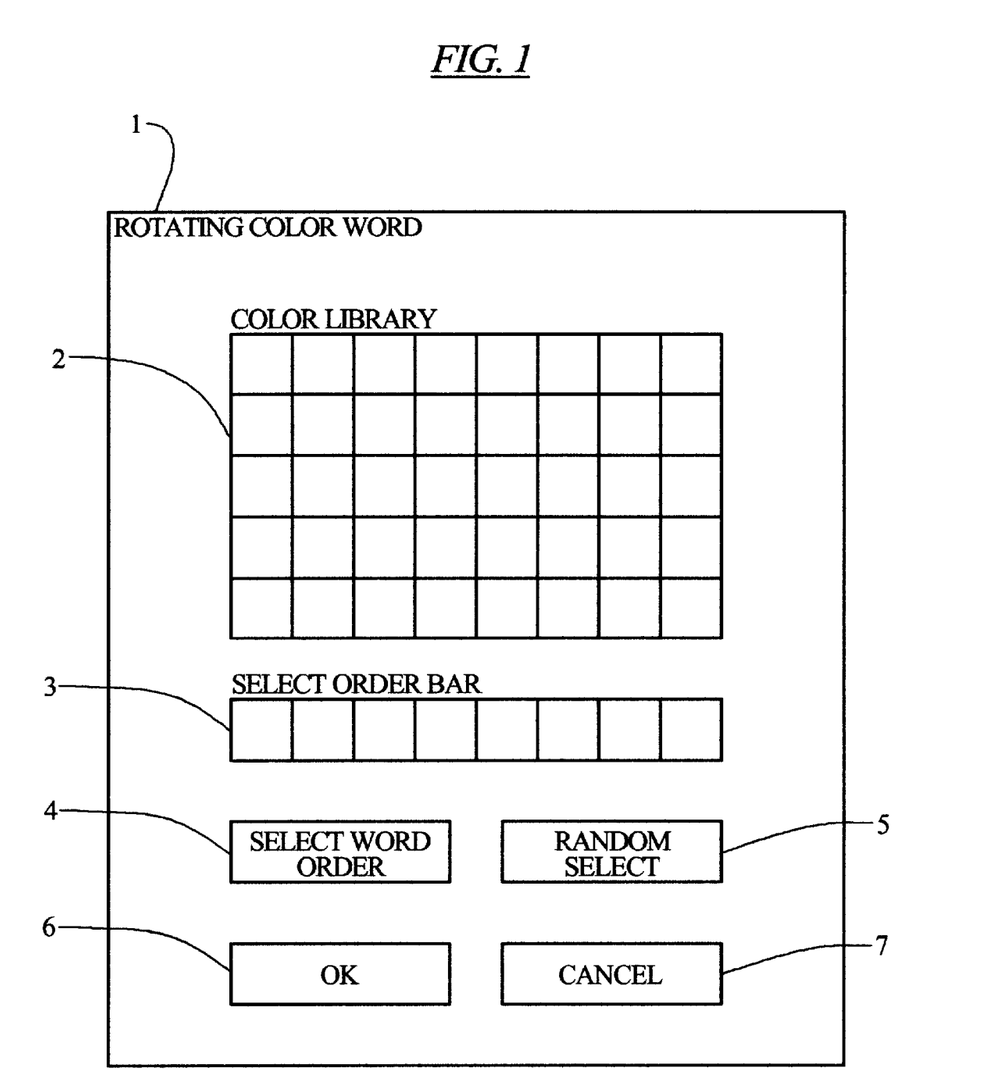
FIG. 1 is shown a structure layout of the Rotating Color Word.

Refer now to FIG. 1, which is an overall drawing of a preferred embodiment of the current invention. Rotating Color Word selector 1 is displayed in a dialog box on the desktop of a computer. The Rotating Color Word 1 Selector contains a color library with 40 color selections 2. In addition, a select order bar 3 is directly below said color library 2 for color selections from said color library 2. The color selections 2 appearing in a left to right order on the select order bar 3. As appreciated by those skilled in the art, a user indicates the desired color by selecting the sample containing the color choice by manipulating a pointing mechanism for identifying said color selection. The select word order button 4 is invoked by said user and the sample is stored from left to right on the select order bar 2. This dialog box is short lived with the select order bar 3, which contains 8 selections. Random selection button 5, when activated, causes Rotating Color Word Selector 1 to activate the Rotating Color Word. When the random selection button 5 is activated, the window closes and Rotating Color Number and Symbol selector 9 opens. Below tho random selection button 5 is a cancel button 7 for dismissing Rotating Color Word 1. As soon as said cancel button 7 is activated, the Rotating Color Number and Symbol selector 8 will then come up on the displayer immediately. OK button 6, when activated, dismisses Rotating Color Word 1. The OK button 6 will then open Rotating Color Number & Symbol selector 8.

Figure 2:
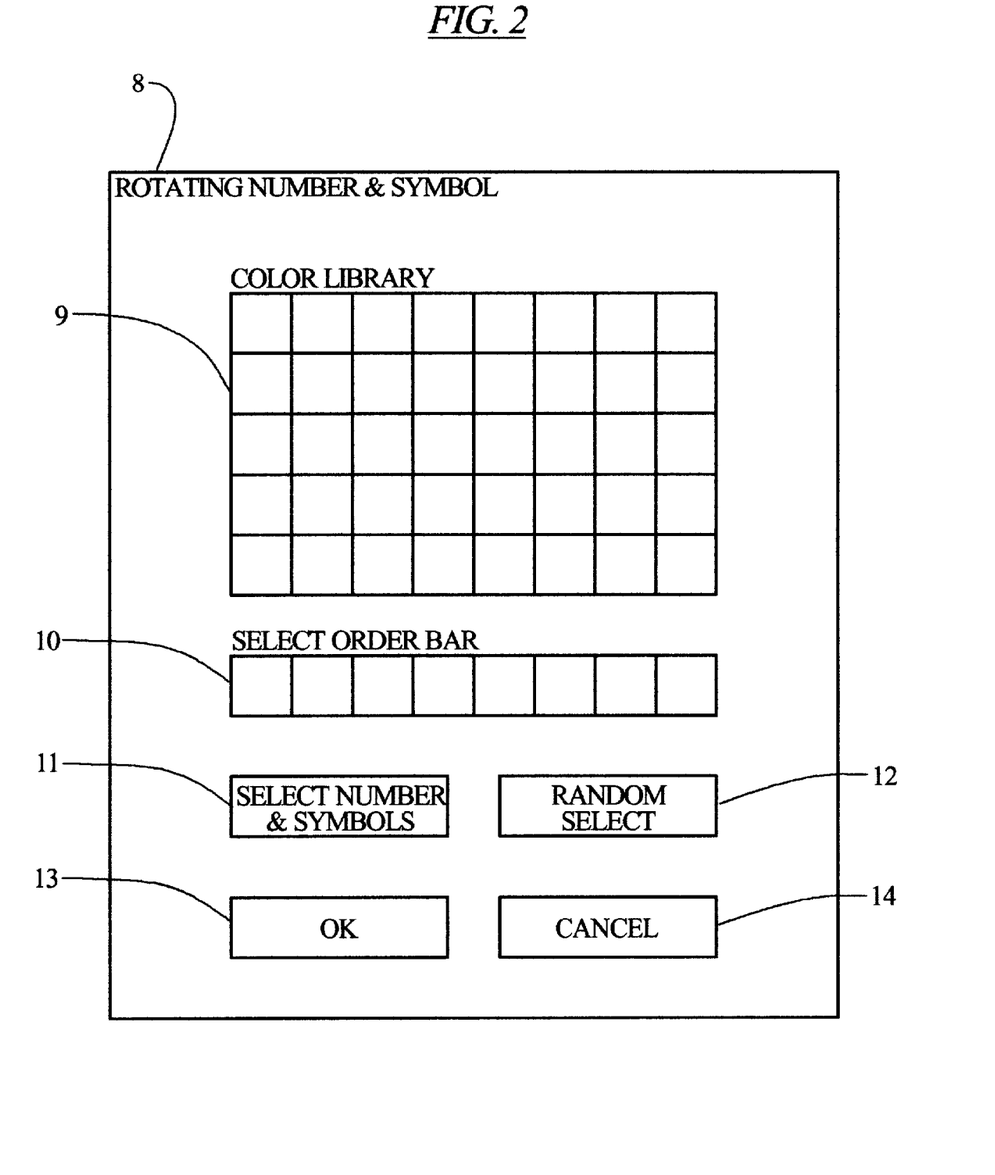
FIG. 2 is shown a structure layout of the Rotating Color Numbers and Symbols.

Referring now to FIG. 2, there is shown a Rotating Color Number and Symbol 8 displayed in a dialog box on the desktop of a computer. The Rotating Number and Symbol 8 contains a color library with 40 color selections 9. In addition, a select order bar 10 is directly below said library 9 for color selections from said library 9. The color selections appear in a left to right order on the select order bar 10. As appreciated by those skilled in the art, a user indicates, the desired color by selecting the sample contains the color choice. The select number and symbols button 11 is invoked by said user and the sample is stored to the select order bar 10 in an order from left to right. Random selection button 12, when activated, causes Rotating Color Number and Symbol selector 8 of the random selection computer program to immediately start. This allows the computer program to choose the order of color number and symbols in the text line. This dialog box is short lived. When the random selection button is activated, the Rotating Number and Symbol selector 8 closes, and Rotating Color Punctuation 15 immediately opens. Below the random selection button 12 is a cancel button 14 for dismissing Rotating Number and Symbol selector 8, and the dismissing of Rotating Number and Symbol selector 8 immediately opens Rotating Color Punctuation selector 15.

Figure 3:
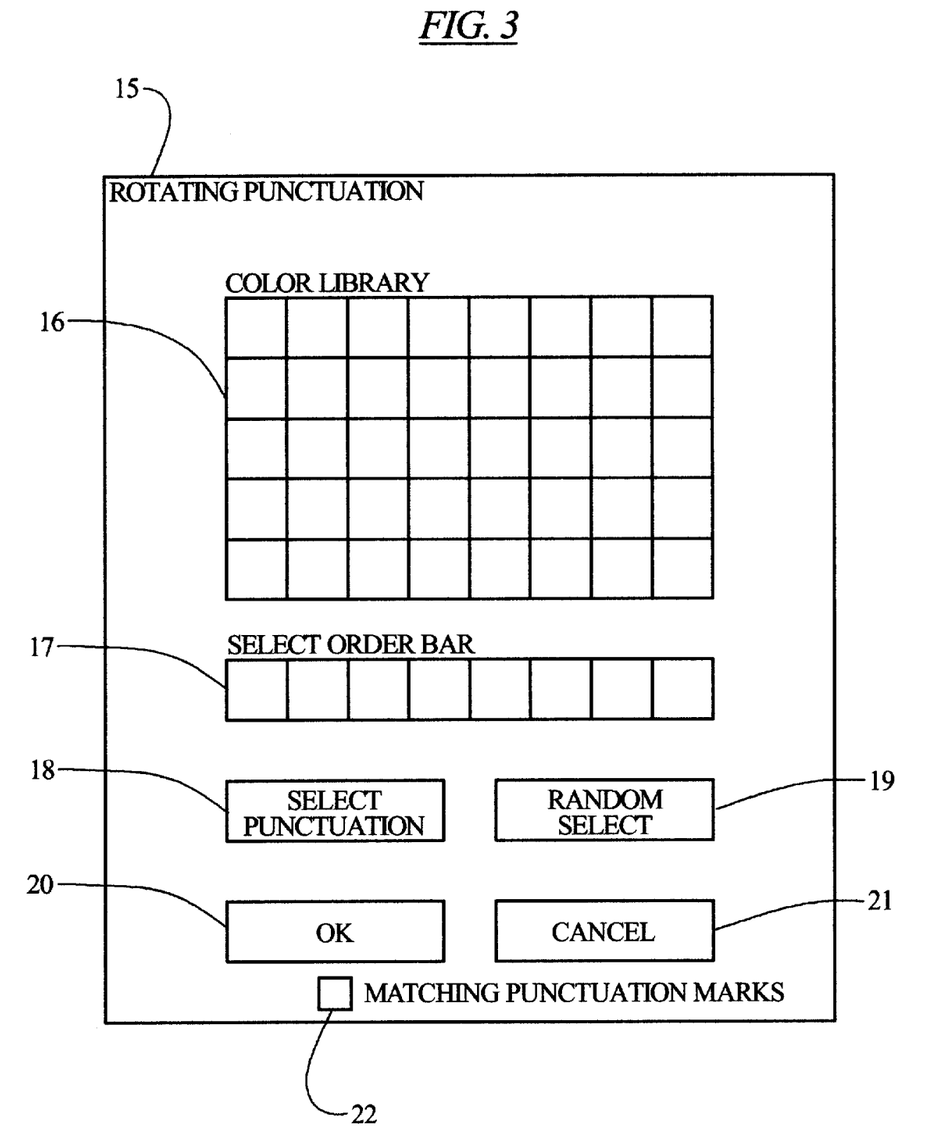
FIG. 3 is shown a structure layout of the Rotating Color Punctuation.

Referring now to FIG. 3, which is an overall drawing of a preferred embodiment of the current invention. Rotating Color Punctuation Selector 15 is displayed in a dialog box on the desktop of a computer. The Rotating Color Punctuation Selector 15 contains a color library with 40 color selections 16. In addition, a select order bar 17 is directly below said color library 16 for color selections from said library 16. The color selections appear in a left to right order on the select order bar 17. As appreciated by those skilled in the art, a user indicates the desired color by selecting the sample containing the color choice. The select punctuation button 18 is invoked by said user and the sample is stored on the select order bar 17 in a left to right order. Random selection button 19, when activated, causes Rotating Color Punctuation Selector 15 of the random selection computer program immediately to start. This allows the computer program to choose the order of color punctuation in the text line. This dialog box is short lived. When the random selection button 19 is activated, the selector is immediately dismissed and program is fully activated. Below the random selection button 19 is a cancel button 21 for dismissing Rotating Color Punctuation selector 15. The OK button 20, when activated, dismisses Rotating Punctuation, and the program is then fully activated. The control tool check box 22 is located below the OK button 20. When selected, it displays a x in the center of the box 22. This box, when invoked, activates rotating punctuation computer program that allows matching punctuation marks, such as quotation marks, the same color on the text line. This allows said user more control and uniformity in handling the color selections. This also allows the use of some color with one selector or all 3 selectors. The default of an empty selector is the black color.

Figure 4:
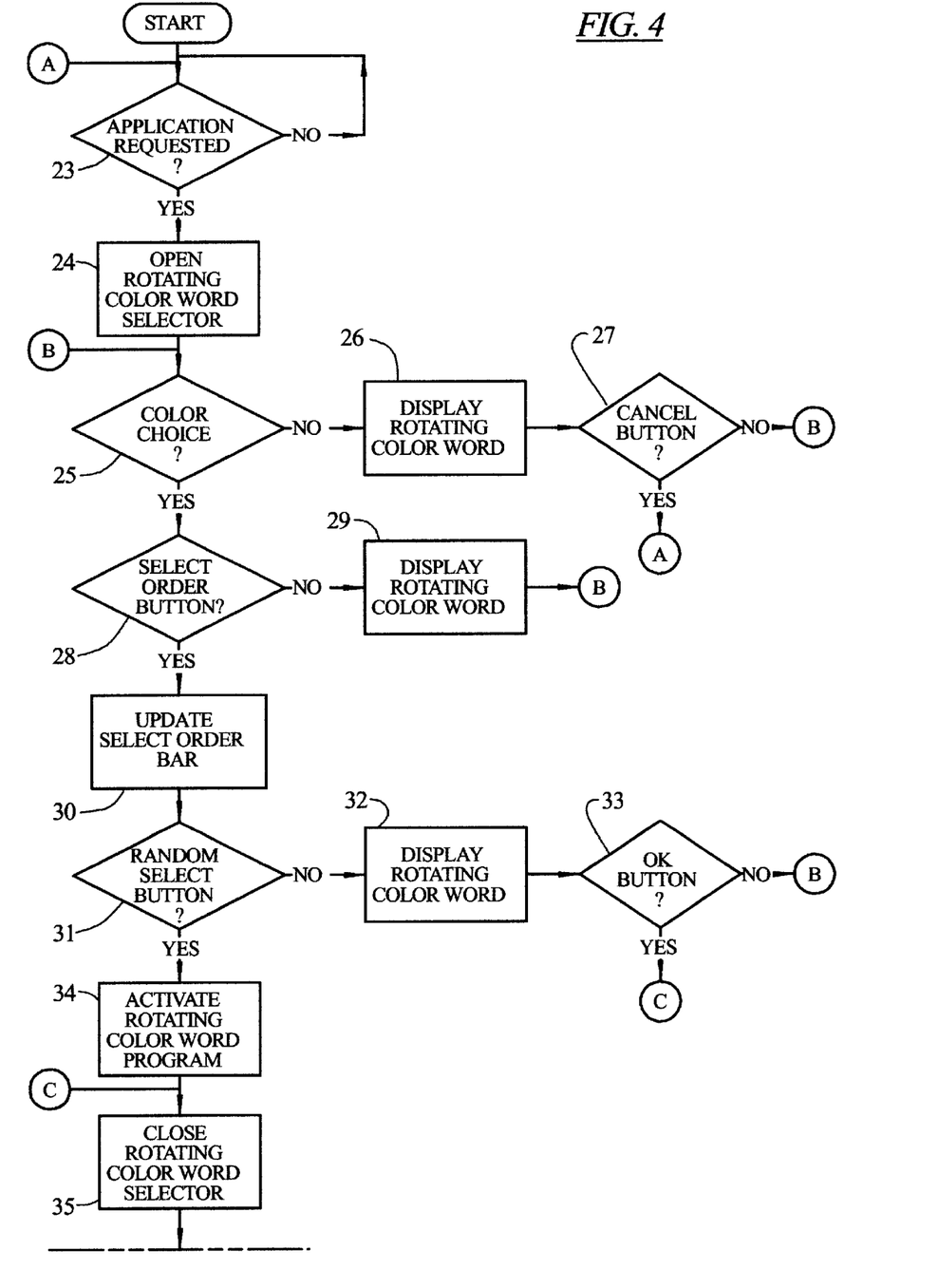
FIG. 4 is shown a procedure of an application of the Rotating Color Word.
Figure 5:
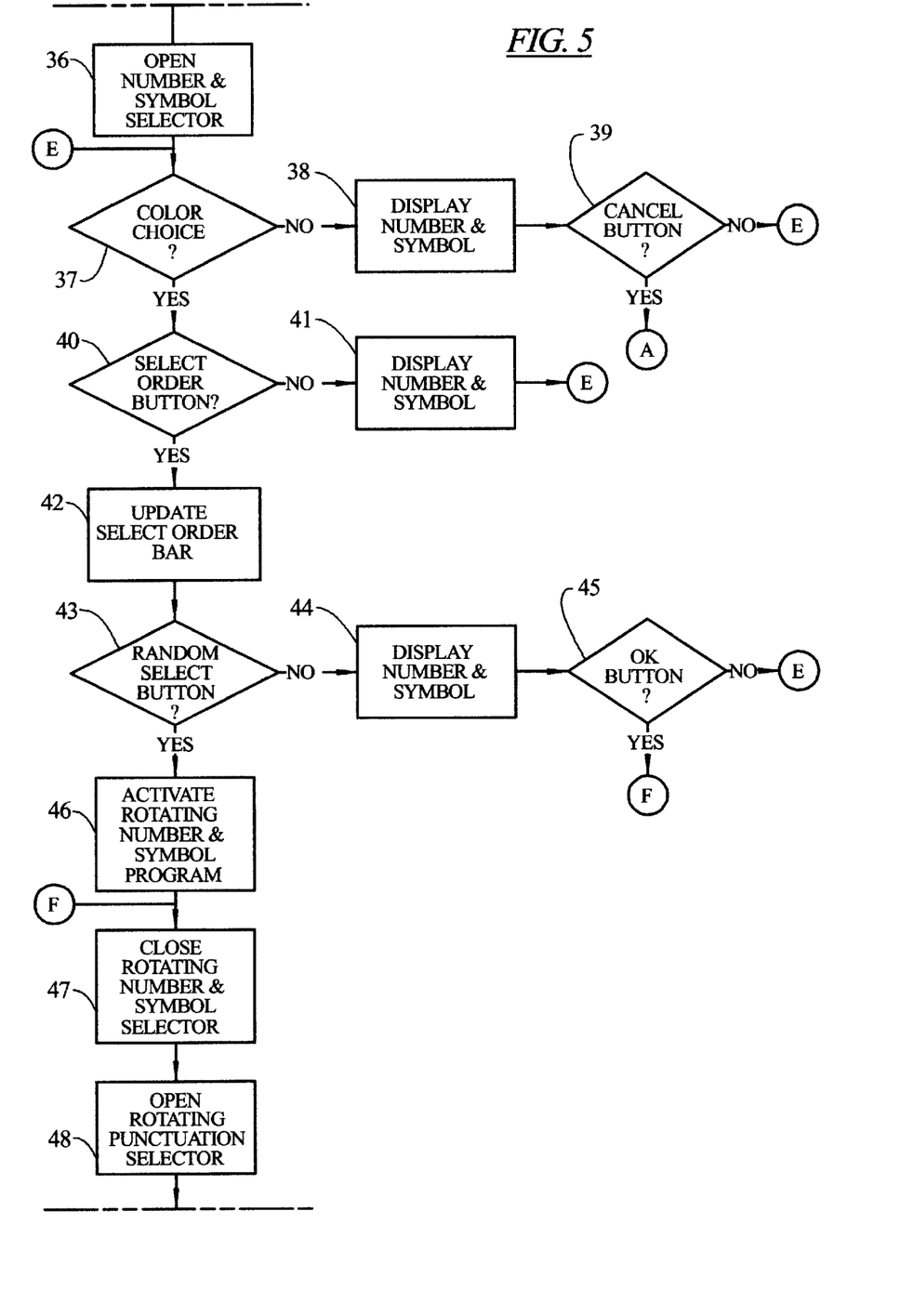
FIG. 5 is shown a procedure of an application of the Rotating Color Numbers and Symbols.
Figure 6:
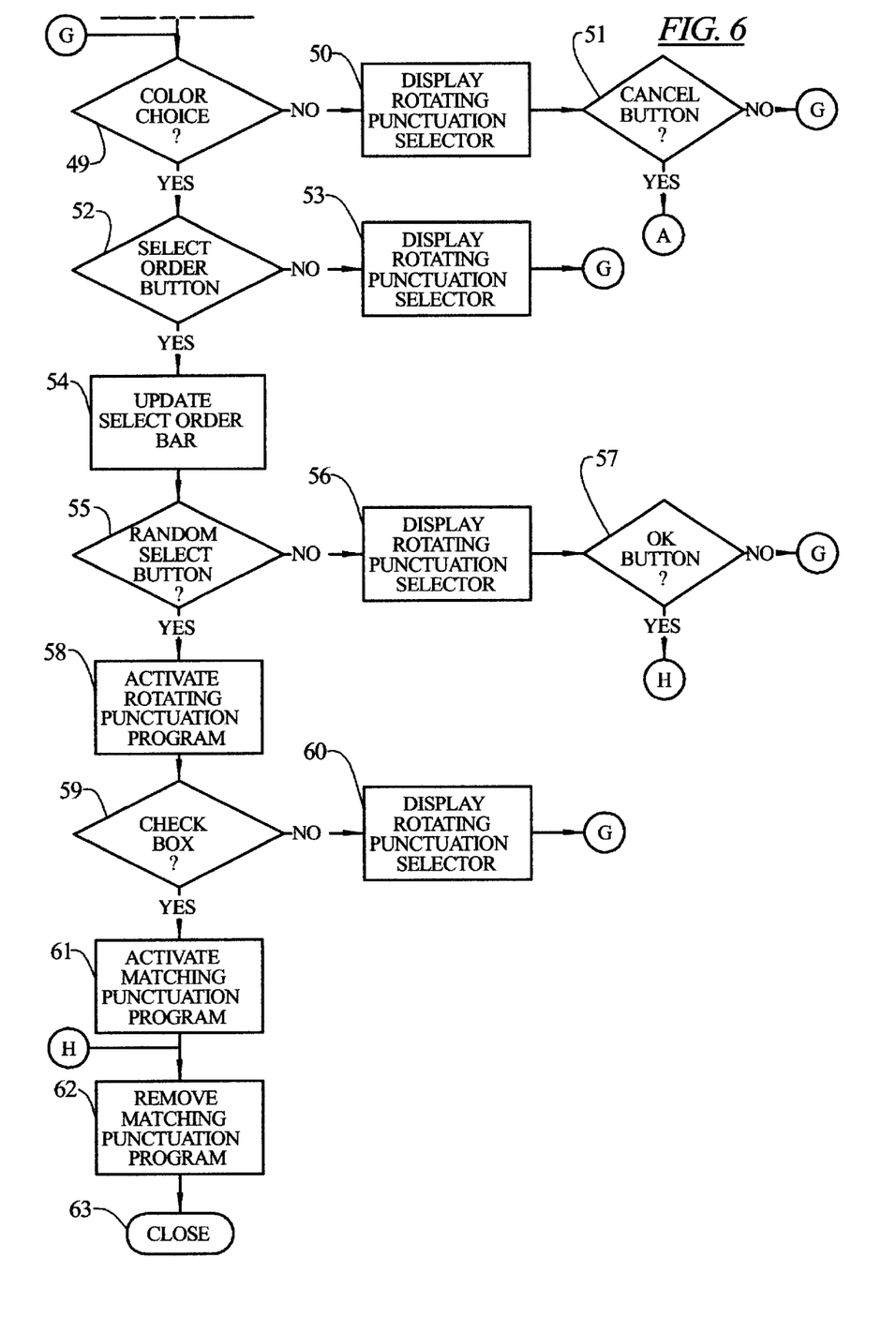
FIG. 6 is shown a procedure of an application of the Rotating Color Punctuation.

Turning now to FIG. 4, there is shown a flow diagram for defining rotating color word using this invention from the top of the figure at the start block, and proceeds immediately to block 23, where a check is conducted to determine if an application request has been detected. If Yes, the procedure opens the Rotating Color Word selector at block 24; if No, the procedure contains looping awaiting application request. Processing proceeds to block 25, the procedure checks to determine if a color is selected from the color library. If Yes, processing proceeds to block 27, where a check determines if the select order button has been selected. If Yes, at block 30, the procedure updates the select order bar. Returning to block 26, the procedure displays Rotating Color Word Selector. At block 27, a check determines if the cancel button has been activated. If Yes, the processing returns to block 23, where a check is determined if an application request has been detected. If NO, the processing refers to insertion point B. At block 31, a check to determine if the random select button has been selected. If Yes, at block 34 the rotating color word computer program is selected. At block 33, a check is done to see if the OK button has been selected to activate the rotating color word program. If NO, at block 32, Rotating Color Word is displayed. Procedure proceeds to block 33, where a check determines if the OK button has been selected. If YES, program follows insertion point C. If NO, the program follows insertion point B at block 34. One skilled in the art will appreciate that Rotating Color Word dialog is relatively transient. At block 35, Rotating Color Word immediately disappears, after random select button block 31 and the OK button block 33 are selected. Referring now to FIG. 5, immediately after Rotating Color Word is dismissed, Rotating Color Number and Symbol selector opens block 36. Processing proceeds to block 37 where the procedure determines if a color has been selected from the color library. Processing goes to block 40 where a check determines if the select order button has been selected. If YES, at block 42 the procedure updates the select order bar. Returning to block 37, if there is no color choice selected processing continues to block 38 displaying Rotating Color Number and Symbol selector. At block 39, a check determines if the cancel button has been activated. If YES, the processing returns to block 23, where a check is determined it application request has been detected. If NO, the processing returns to insertion point E. At block 43, a check to determine if the random select button has been selected. If YES, the Rotating Color Number and Symbol program is activated. If NO, as block 44 Rotating Color Number and Symbol is displayed. Procedure proceeds to block 45, where a check determines if the OK button has been selected. If YES, program follows insertion point F. If NO, the program follows insertion point E. At block 47, one skilled in the art will appreciates that Rotating Color Number and Selector immediately disappears. After random select button block 43 is selected, OK button block 45 is selected. Processing continues and immediately opens Rotating Color Punctuation selector block 48. Referring now to FIG. 6, the process proceeds immediately to block 49, where the procedure checks to determine if a color is selected from the color library. If the check determine, that a choice has, been selected, the process then proceeds to block 52, where a check determines if the select order button has been selected. At block 54, the procedure updates the select order bar. Returning to block 49, if there is no color choice selected, the procedure continues to block 50 and displaying Rotating Color punctuation selector. At block 51, a check determines if the cancel button has been activated. If YES, the processing returns to insertion point A, block 23, where a check is determined if an application request has been detected. If NO, the processing returns to insertion point G. At Block 55, a check to determine if the random select button has been selected. If YES, at block 58 the rotating color punctuation symbol program is activated. If NO, Rotating Color Number and Symbol is displayed 56. The procedure then proceeds to block 57, where a check determines if the OK button has been selected. If YES, the procedure follows insertion point H. If NO, the procedure follows insertion point G. At block 59, there is a check to determine if the control tool check box has been selected. If YES, the matching punctuation program is invoked. That matches colors of matching punctuation marks, such as "quotations" marks. At block 62, the procedure terminates Rotating Color Punctuation, and exits the procedure at block 63.

I claim:

1. A color rotating word generating process by using graphical user interface for creating rotating color words displayed in a text line of a displayer of a data processing system, said color rotating word generating process comprising:

generating a request to change said text line to rotating color words on said displayer;

presenting a Rotating Color Text selector on said dislayer having a color library, a select order bar, a select order button, a random selection button, an ok button and a cancel button, said Rotating Color Text selector disappearing immediately from a user viewing upon activating said ok button, immediately activating a Rotating Color and a Number Selector;

identifying one of the colors from said color library by manipulating a pointing mechanism for identifying a color selection;

selecting said color selection by a select word order button, said select order bar having a plurality of selections, said plurality of selections being placed in a left to right order, said plurality of selections in said select order bar determining the order of the color of said rotating color words in said text line;

selecting said random select button in said Rotating Color Word selector, activating a Rotating Color Word computer program, said Rotating Color Word computer program making said color selections for said user, said Rotating Color Word selector disappearing immediately from said user viewing upon activating said random selection button, and immediately activating said Rotating Color Number and said Symbols selector; and selecting said ok button, dismissing said Rotating Color Word selector and immediately activating a Rotating Number and Symbol selector.

2. An apparatus for creating rotating color text displayed on a computer desk top of a data processing system, said apparatus comprising:

means for generating a request to change a color text to rotating color words on said computer desktop;

means for presenting a Rotating color Word selector on said computer desktop having a color library, a select order bar, a select order button, a random selection button, an ok button, and a cancel button, said Rotating Color Word selector, disappearing immediately from a user viewing upon activating said ok button;

means for identifying one of the colors from said color library by manipulating a pointing mechanism for identifying a color selection;

means for selecting a color choice by said select order bar, said select order bar having 8 selections, said 8 selections being placed in a left to right order, color selection in said select order bar determining the order the color of said color text;

means for selecting said random select button in said Rotating Color Word selector, activating a Rotating Color Word Computer program, said Rotating Color Word Computer program making color selections for the user, Rotating Color Word Selector disappearing immediately from said user viewing upon activating said random selection button, and immediately activating a Rotating Color Number and Symbol selector; and means for activating said ok button, dismissing said Rotating Color Word selector and a Rotating Number and Symbol selector.

3. A computer program product having a computer thereon for a graphical user interface for creating a rotating color text displayed on a computer desktop of a data processing system, said computer program product comprising:

computer readable means for generating a request to change said rotating color text on said computer desktop;

computer readable means for presenting a Rotating Color Word selector on said computer desktop having a color library, said color library having a plurality of colors, a select order bar, a select order button, a random selection button, an ok button, and a cancel button, said Rotating Color Word selector, disappearing immediately from a user viewing upon activating said ok button and immediately activating a Rotating color Number and Symbol selector;

computer readable means for identifying one of said colors from said color library by manipulating a pointing mechanism for selecting said color;

computer readable means for selecting said color by said select order button from said select order bar, said select order bar having a plurality of selections said plurality of selections being placed in a left to right color order, color selection in said select order bar determines the order the color of words, in a text line;

computer readable means for selecting said random select button in said Rotating Color Word selector, activating a rotating color word computer program, said rotating color word computer program making color selections for said user, said Rotating Color Word selector disappearing immediately from said user viewing upon activating, said random select button and immediately activating a Rotating Number and Symbol selector; and computer readable means for activating said ok button dismissing said Rotating Color Word selector and immediately activating a Rotating Number and Symbol selector.

4. A graphical user interface for creating rotating color number and symbols displayed in a text line of a computer desktop of a data processing system, said graphical user interface comprising:

generating a request to change said text line to rotating color numbers and symbols on said computer desktop;

presenting a Rotating Number and Symbol selector on said computer desktop having a color library, said color library having a plurality of colors, a select order bar, a select order button, a random selection button, an ok button and a cancel button, said Rotating Number and Symbol selector disappearing immediately from a user viewing upon activation said ok button and immediately activating a Rotating color Punctuation selector;

identifying a color from said plurality of colors in said color library by manipulating a pointing mechanism for identifying said color;

selecting said color by a select number and symbol button, said select order bar having a plurality of selections, said plurality of selections being placed in a left to right order, said left to right order determines the order the color of number and symbols in said text line;

selecting said random selection button in said Rotating Number and Symbol selector, activating a Number and Symbol computer program, said Number and Symbol computer program making selections for said user, said Rotating Number and Symbol selector disappearing immediately from said user viewing, upon activating said random selection button, and immediately activation a Rotating color Punctuation selector; and selecting said ok button, dismissing a second Rotating Color Number and Symbol selector and immediately activating a Rotating Color Punctuation selector.

5. An apparatus for creating rotating color numbers and symbols displayed in a text line on a computer desktop of a data processing system, said apparatus comprising;

means for generating a request to change said rotating color numbers and symbols on said computer desktop;

means for presenting a Rotating Number and Symbol selector on said computer desktop having a color library, said color library having a plurality of colors, a select order bar, a select order button, a random selection button, an ok button, and a cancel button, said Rotating number and Symbol selector disappearing immediately from a user viewing upon activating said ok button and immediately activating a Rotating Color Punctuation selector; and means for identifying a color from said plurality of colors from the color library by manipulating a pointing mechanism for identifying said color;

means for selecting said color by said select order button, said select order bar having a plurality of selections, said plurality of selections being placed in said select order bar, in a left to right order, said plurality of selections in said select order bar determining the order of the color of said text line;

means for selecting said random select button in said Rotating Number and symbol selector, activating a rotating color number and symbol computer program, said rotating color number and symbol computer program making color selections for said user, said Rotating Number and Symbol selector disappearing immediately from said user viewing upon activating said random selection button, and immediately activating a Rotating Punctuation selector; and means for activating said ok button, dismissing a second Rotating Color number and symbol selector and immediately activating said Rotating Color Punctuation selector.

6. A computer program product having a computer readable medium having computer program logic recorded thereon for a graphical user interface for creating rotating color numbers and symbols displayed on a computer desktop of a data processing system, said computer program product comprising:

computer readable means for generating a request to change said color numbers and symbols on said computer desktop;

computer readable means for presenting a Rotating Number and Symbol selector on said computer desktop having a color library, said color library having a plurality of colors, a select order bar, a select order button, a random selection button, and ok button, and a cancel button, said Rotating color Number and Symbol selector, disappearing immediately from a user viewing upon activating said ok button and immediately activating a Rotating color Punctuation selector;

computer readable means for identifying a color from said plurality of colors in said color library by manipulating a pointing mechanism for identifying said color;

computer readable means for selecting said color by said select order button, said select order bar having a plurality of selections, said plurality of selections being placed in a left to right color order, said plurality of selections in the select order bar determining the order of the color of said text line;

computer readable means for selecting said random selection button in said rotating number and symbol selector, activating a rotating number and symbol computer program, said rotating number and symbol computer program making color selections for said user, a Rotating Color Number and Symbol selector disappearing immediately from said user viewing upon activating said random select button and immediately activating a Rotating Punctuation selector; and computer readable means for activating said ok button dismissing said Rotating Number and Symbol selector and immediately activating said Rotating Punctuation selector.

7. A graphical user interface for creating rotating punctuation displayed in a text line on a computer desktop of a data processing system, said graphical user interface comprising:

generating request to change said rotating punctuation to rotating color punctuation on said computer desktop;

presenting a Rotating Color Punctuation selector on said computer desktop having a color library, said color library having a plurality of colors, a select order bar, a select order button, a random selection button, an ok button and a cancel button, a control tool check box, said Rotating color Punctuation selector disappearing immediately from a user viewing upon activating said ok button;

identifying a color from said plurality of colors from the color library by manipulating a pointing mechanism for identifying said color;

selecting said color by said select word order button, said select order bar having a plurality of selections, said plurality of selections being placed in a left to right order, said plurality of selections determining the order of the color of said text line;

selecting said random select button in said Rotating Color Punctuation selector, activating a rotating color punctuation computer program, said rotating color punctuation computer program making color selections for said user, said Rotating Color Punctuation selector disappearing immediately from said user viewing, upon activating said random selection button;

selecting said ok button, dismissing said Rotation color Punctuation selector and activating said rotating color punctuation computer program; and selecting said control tool check box, said control tool check box matching color of sets of punctuation when being activated.

8. An apparatus for creating rotating punctuation text displayed in a text line on a computer desktop of a data processing system, said apparatus comprising:

means for generating a request to change color of punctuation on said computer desktop;

means for presenting a Rotating Color Punctuation selector on said computer desktop having a color library, said color library having a plurality of colors, a select order bar, a select order button, a control tool check box for matching punctuation marks, a random selection button, an ok button, and a cancel button, said Rotating Color Punctuation selector, disappearing immediately from a user viewing upon activating said ok button; and means for identifying a color from said plurality of colors from said color library by manipulating a pointing mechanism for identifying said color; and means for selecting said color by said select order button, said select order bar having a plurality of selections, said plurality of selections being placed in a left to right order, said plurality of selections determining the order of the color of said text line;

means for selecting said random select button in said Rotating Color Punctuation selector, activating a rotating color punctuation computer program, said rotating color punctuation computer program making color selections for said user, said Rotating Color Punctuation selector disappearing immediately from said user viewing upon activating said random selection button;

means for activating said ok button, dismissing a third Rotating color Punctuation selector; and means for selecting said control tool check box, said control tool check box matching color of sets of punctuation marks.

9. A computer program product having a computer readable medium having computer program logic recorded thereon for a graphical user interface for creating rotating color punctuation displayed on a computer desktop of a data processing system, said computer program product comprising:

computer readable means for generating a request to change said rotating color punctuation on said computer desktop;

computer readable means for presenting a Rotating Color Punctuation selector on said computer desktop having a color library, said color library having a plurality of colors, a select order bar, a select order button, a random selection button, an ok button, a cancel button, and a control tool check box for match color sets of punctuation marks, said Rotating Color Punctuation selector, disappearing immediately from a user viewing upon activating said ok button;

computer readable means for identifying a color from said plurality of colors from said color library by manipulating a pointing mechanism for identifying said color;

computer readable means for selecting said color by said select order button, said select order bar having a plurality of selections, said plurality of selections being placed in a left to right color order, said plurality of selections determining the order of the color of punctuations said text line;

computer readable means for selecting said random select button in said Rotating Color Punctuation selector, activating a rotating color punctuation computer program, said rotating color punctuation computer program making color selections for said user, said Rotating Color Punctuation selector disappearing immediately from said user viewing upon activating said random select button and immediately activating said rotating color punctuation computer program;

computer readable means for activating said ok button dismissing a third Rotating Color Punctuation selector and immediately activating said color rotating punctuation computer program; and computer readable means for activating said control tool check box in said Rotating Color Punctuation selector, said control tool check box matching color sets of punctuation marks, such as quotation marks, when being activated.

* * * * *